United States Patent
Lee et al.

(10) Patent No.: US 6,601,101 B1
(45) Date of Patent: Jul. 29, 2003

(54) TRANSPARENT ACCESS TO NETWORK ATTACHED DEVICES

(75) Inventors: David C. Lee, San Jose, CA (US); Peter S. S. Wang, Cupertino, CA (US); Anne G. O'Connell, Cork (IE)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/525,965

(22) Filed: Mar. 15, 2000

(51) Int. Cl.⁷ ............................................. G06F 15/16
(52) U.S. Cl. ..................... 709/227; 709/202; 709/203; 709/229; 709/230; 709/238; 709/239; 709/240
(58) Field of Search ................................. 709/202–203, 709/220, 223–224, 226–230, 236–240

(56) References Cited

U.S. PATENT DOCUMENTS

| | | | |
|---|---|---|---|
| 6,006,264 A | * 12/1999 | Colby et al. | 709/226 |
| 6,108,701 A | * 8/2000 | Davies et al. | 709/224 |
| 6,345,302 B1 | * 2/2002 | Bennett et al. | 709/236 |
| 6,449,647 B1 | * 9/2002 | Colby et al. | 709/226 |
| 6,496,866 B2 | * 12/2002 | Attanasio et al. | 709/239 |

OTHER PUBLICATIONS

"Extreme NASD" consisting of 5 pages dated Jun. 7, 1999.
"Active Disks—Remote Execution for Network–Attached Storage" consisting of 8 pages dated Mar. 28, 1999.
"High–bandwidth, Low–latency, and Scalable Storage Systems" consisting of 17 pages No Date.
"The Official Bluetooth Website" consisting of 6 pages No Date.
Charles E. Perkins "Mobile Networking Through Mobile IP" IEEE Internet Computing Jan.–Feb. 1998 pp. 58–69.

(List continued on next page.)

Primary Examiner—Bharat Barot
(74) Attorney, Agent, or Firm—Ernest J. Beffel, Jr.; Haynes Beffel & Wolfeld LLP

(57) ABSTRACT

The present invention relates to transparent access to network attached devices, such as network attached storage devices, Web servers or database servers. In particular, the present invention provides hand-off protocols that are transparent to a network client, with the advantage that physical devices can be added to, replaced on or removed from a network without reconfiguring network clients or applications running applications at levels above the network clients. One aspect the present invention is a method for handing off TCP sessions in a system including a client in communication with a switch and to or more devices. This method includes determining in the first device that a handoff should take place, identifying a second device to take over the session, sending handoff messages to and receiving an acknowledgment from the second device, and reporting the handoff to and receiving an acknowledgment from the switch. The devices applying this method may be disk drives, Web servers, database servers or any other device that benefits from being clustered. A device according to the present invention may comprise: a switch including logic for routing messages among a client and a plurality of devices and logic responsive to an instruction to reprogram its routing messages and to confirm the road reprogramming is complete; a first device including logic to determine when a TCP session should be handed off to another device, logic to instruct a second device to accept a handoff, and logic to instruct a switch to reprogram its routing of messages; wherein the second device is in communication with the switch and includes logic responsive to an instruction to accept a handoff and to confirm acceptance of the handoff. The first and second devices may be disk drives, Web servers, database servers or any other device that benefits from being clustered. Logic may be included to determine when to handoff a TCP session and to identify a second device to receive the handoff, consistent with the method of present invention.

53 Claims, 8 Drawing Sheets

OTHER PUBLICATIONS

Mark Stemm "Vertical Handoffs in Wireless Overaly Networks" Computer Science Division, Department of Electrical Engineering and Computer Science University of California at Berkeley pp. 1–29 No Date.

Mark Stemm et al. "Vertical Handoffs in Wireless Overlay Networks" Computer Science Division, Department of Electrical Engineering and Computer Science University of California at Berkeley pp. 1–18 No Date.

"Bluetooth Protocol Architecture" Sep. 29, 1999 pp. 1–20.

C. Perkins "IP Mobility Support" Network Working Group Oct. 1996 pp. 1–79.

David B. Johnson, "Mobility Support in IPv6" IETF Mobile IP Working Group Oct. 17, 2000 pp. 1–40.

Akhtar Jameel et al. "Web on Wheels Toward Internet–Enabled Cars" 1998 IEEE pp. 69–76.

Edmond Sung et al. "Software Assisted Handover of Mobile Clients in Heterogeneous Wireless Computing Environments" 1997 IEEE pp. 527–528.

* cited by examiner

TRANSPARENT ACCESS TO NETWORK ATTACHED DEVICES

RELATED APPLICATION REFERENCE

The present application, is related to co-pending U.S. patent application Ser. No. 09/525,966 entitled Transparent Switched Access To Network Attached Storage, invented by Peter S. S. Wang, David C. Lee and Anne G. O'Connell, filed on the same day as the present application, and owned by the same assignee now and at the time of the invention.

BACKGROUND OF THE INVENTION

1. Field of the Invention

The present invention relates to transparent access to network attached storage devices, whether configured as SCSI over IP, NAS or NASD devices. In particular, the present invention provides a method and device for using a switch as a virtual storage device, with the advantage that physical devices can be added to, replaced on or removed from a network without reconfiguring network clients or applications running at levels above the network clients.

2. Description of Related Art

There is a trend towards use of cluster devices on networks to improve performance, fail over, load-balancing, robustness and other characteristics of network devices. In a cluster device, multiple network devices share the workload of what was originally handled by one device, increasing capacity and scalability while minimizing vulnerability to a single point of failure or a single bottleneck. Transparency can be achieved when addresses are available via mechanisms such as round-robin domain name service ("DNS"), where the cluster shares a single fully qualified domain name ("FQDN") and the name resolution process returns different IP addresses for devices sharing the same FDQN. Protocols such as dynamic host configuration protocol ("DHCP") have been widely adopted for allocating available addresses. However, allocation of addresses as an approach to transparency requires available addresses and DNS services. It also may require modification network client software and special or modified application software.

Sometimes it is desirable for backward compatibility with older network clients or due to lack of available addresses for cluster of devices to share one virtual IP address. To maintain transparency when cluster devices share the same virtual IP address, the network client must believe that the transport session endpoint is the virtual IP address. The client must address a single logical device without being aware that there are multiple physical devices. It is desirable for the network transport session to be able to change the device or endpoint within a cluster which is communicating with the client without the client being aware of the change. Having a technology that facilitates such transparency, without any need to change existing client software or IP stacks, may significantly increase the rate of introduction of new clustering technologies. Transparency technology also may facilitate the development of wireless systems.

For networks relying on the transport control protocol ("TCP"), there are three logical approaches for supporting cluster devices. One approach is to replay transport connections from one device to the next. The second approach is for the server to instruct the client software to use a specific device within a cluster. Finally, there is the approach to the present invention, to handoff connections transparently among devices within a cluster. A disadvantage of the replay approach is that it generates additional traffic and introduces latency. A disadvantage of the EAP approach is that it requires potentially significant structural changes to the IP stacks in the client and the use of IP options. In essence, the IP stack must be changed so that it understands the existence of a cluster and distinguishes among devices within the cluster. The handoff approach avoids these problems.

Handoffs clearly have benefits when working with clustered systems, server area networks, network attached storage, and other similar to loosely distributed models. Handoffs allow the systems to appear as a virtual IP host through which the transport connections are directly forwarded to the node being utilized; other nodes in the system are not affected. Resource utilization is more efficient and transparent fail over is more easily accomplished. Handoffs may help solve problems with address transparent leases, as in the proposed IP version 6 re-numbering. Handoffs also may aid servers in communication with a network address translation ("NAT") device, if the NAT is performing a cluster-like role.

A variety of network devices may benefit from virtual IP addressing. Disk drives with built-in file systems, sometimes referred to as network attached storage devices ("NAS"), are one type of the device the would benefit from or function as a cluster. Web servers, database servers, networked computing clusters and load balancing servers also may benefit from virtual IP addressing. In general, any type of network device that would benefit from a cluster being addressed by a single virtual IP address may benefit from transparency technologies. Virtual addressing can be cascaded, so that a virtual IP cluster may appear as a single address within another virtual IP cluster. Network attached storage is prominent among the variety of network devices that may benefit from the present invention.

Network Attached Storage is a storage paradigm in which disks are detached from the server and placed on the network. Ideally, the server is removed from the datapath between client and data. The goal of a NAS system is to increase the overall performance of the system while reducing the total cost of ownership (TCO). New functionality, such as the appearance of infinite disk capacity and plug-and-play configuration, can be incorporated. Improved performance and functionality at a reduced TCO are made possible by the ever increasing disk and switch device capabilities. These capabilities allow offload of processing from a centralized server to smarter devices and possible elimination of the server itself.

Three different strategies can be pursued to develop a NAS solution. The ultimate strategy would be a serverless network attached storage. The strategy names are related to the client-disk datapath; Strategy 1—Server-centric NAS; Strategy 2—Serverless NAS; and Strategy 3—Master/Slave NAS.

A traditional file system is managed as a client/server system. The client accesses the server which has all the required disks integrated with the server. The storage is referred to as Server Integrated Disk (SID) storage. The server-centric strategy has begun migrating from the Server Integrated Disk model to use of internal (SCSI) communication paths across a network. The new model allows disks to be arbitrarily placed on the network. It relies on a form of networked SCSI (SCSI over IP) to attach the disks logically to the server. In this context, SCSI over IP is used in an inclusive sense, with the NetSCSI being a particular research implementation by the University of Southern California Information Sciences Institute of SCSI over IP.

This scheme is referred to as Server Attached Disk (SAD). However, the Server Attached Disk model is not expected to yield performance gains. Its gains are expected in ease of use and total cost of ownership.

A "serverless" system is not truly serverless as some central point-of-control needs to exist to reduce system complexity, however the "server" may require insignificant resources. In a serverless system, the system's steady state is direct client and disk communications. Server interaction is an insignificant percentage of the communications. In the serverless approach, the central control point, when required, would be a switch. A serverless approach requires significant changes to client systems, which is a major barrier to acceptance. A serverless system has been suggested by research work at Carnegie Mellon University (CMU) on Network Attached Secure Disks (NASD). In this context, NASD is used in an inclusive sense, to include Object Based Storage Devices (OBSD) and the proposed SCSI-4 standard. Carnegie Mellon's work also includes overlay systems to ensure backwards compatibility with existing networked file system protocols such as Sun's Network File System (NFS) and Microsoft's Common Internet File System (CIFS). Research results indicate high potential for system scalability. Use of a file overlay system, however, tends to defeat performance gains from the switch-based architecture.

NAS benefits from maintaining transparency to the client in how the back-end system (formerly a server) is implemented. The back-end system should appear as if it is one virtual host when, in actuality, it is composed of a number of different devices.

SUMMARY OF THE INVENTION

One aspect of the present invention is a method for handing off TCP sessions in a system including a client in communication with a switch and two or more devices. This method includes determining in the first device that a handoff should take place, identifying a second device to take over the session, sending handoff messages to and receiving an acknowledgment from the second device, and reporting the handoff to and receiving an acknowledgment from the switch. The devices applying this method may be disk drives, web servers, database servers, networked computing clusters, load balancing servers, switches or first devices which aggregate second devices or any other device that benefits from being clustered. The determination that a handoff should take place may be based on the location of the data being processed in the TCP session, whether data returned to the client from a location other than the first device has reached a predetermined threshold, whether data being returned to the client from an other device has reached a predetermined threshold, an evaluation of the relative amount of data being returned to the client from the first device and one or more other devices, or an evaluation of the workload of the first device and other devices. Evaluations may be based on the TCP session of immediate concern or on more than one TCP session involving the first device. Other evaluation criteria will be obvious to one of ordinary skill in the art. Determination of which device should receive the handoff will depend upon a technique adapted to the nature of the devices in the cluster. For disk drives, a virtual root directory may be used. For databases, a table of database objects, transaction types, or database subsystems may be used. These techniques may be applied by the first device or by a third device in communication with the first device.

Another aspect of the present invention is that one of the handoff messages may include a kind field, a client port identification and a client IP address, preferably in the form of a TCP option. In addition, a sequence number and an acknowledgment number may also be passed as a TCP option. The TCP state machine running on the first and second device may be modified with additional states to take into account handoffs and half-handoffs. A Set flag may cause transitions in TCP states on both the first and second devices.

Another aspect of the present invention is that predictive setups may be used to reduce the latency time for a handoff. According to this aspect of the invention, one or more handoff preparation messages may be sent by the first device to other devices and a handoff destination selected from among the devices which acknowledge the handoff preparation messages.

Yet another aspect of the present invention is that only half of the TCP session may need to be handed off. In other words, the first device may allocate to a second device either sending messages to or receiving messages from the client, without allocating both roles.

The present invention may be practiced as either a method or device. A device according to the present invention may comprise: a switch including logic for routing messages among a client and a plurality of devices; a logic responsive to an instruction to reprogram its routing messages and to confirm the road reprogramming is complete; a first device including logic to determine when a TCP session should be handed off to another device, logic to instruct a second device to accept a handoff, and logic to instruct a switch to reprogram its routing of messages; wherein the second device is in communication with the switch and includes logic responsive to an instruction to accept a handoff and to confirm acceptance of the handoff. The first and second devices may be disk drives, web servers, database servers, networked computing clusters and load balancing servers or any other device that benefits from being clustered. Logic may be included to determine when to handoff a TCP session and to identify a second device to receive the handoff, consistent with the method of present invention.

The present invention also includes a method of virtually addressing a plurality of storage devices through a switch. This method includes establishing a TCP session between a client and switch, wherein the switch appears as a virtual storage device. The switch selects one of a plurality of storage devices to participate in the TCP session and the logic of the switch is programmed to forward packets to the selected storage device. According to one aspect of this invention, the client includes TCP logic to participate in the TCP session and this logic is not need be modified in order for the client to recognize the switch as a virtual storage device. The virtual storage device may appear to be one of a variety of storage devices in accordance with any of several protocols, including SCSI over IP, NAS or NASD. The switch may inspect a TCP session packet and read information beyond the TCP/IP header for purposes of selecting a storage device to participate in the established TCP session. If the switch includes a file directory, the file directory may be accessed based on inspection of one or more packets. A storage device may be selected based on the files contained on the storage device or other characteristics of storage device. Once the TCP session is underway, the selected storage device may determine that a different storage device should participate in the session. The present in invention provides for handing off the TCP session and reprogramming switch to forward packets to the other storage device, transparently to the client and its TCP logic.

A significant aspect the present invention is that switch is configured so that virtual storage devices can be cascaded.

That is, one or more of the plurality of storage devices coupled with the switch may be another switch configured to appear as a virtual storage device.

The present invention also allows for aggregation of storage devices connected to a network. The method for aggregation storage devices includes inserting a switch between the storage devices and the network, wherein the switch appears to be a virtual storage device. The switch accepts requests to establish file sessions between clients and storage devices, generally in accordance with the method described above. Both the method for virtually addressing a plurality of storage devices and the method for aggregation of storage devices can be embodied in any the device having a storage medium and a processor connected to the storage medium, storage medium storing a program for controlling the processor and the processor being operative to carry out the methods described above.

DETAILED DESCRIPTION OF THE FIGURES

The detailed description of three embodiments for the present invention is provided with reference to the figures.

Figure 1A:
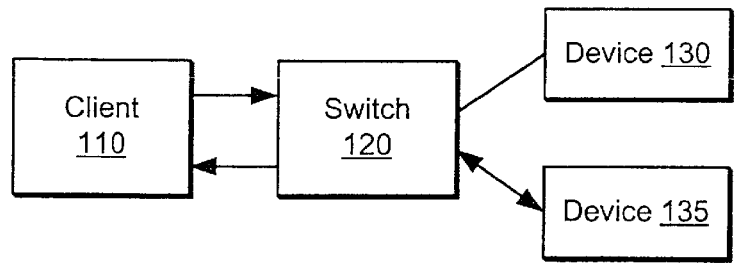
FIGS. 1A and 1B illustrate patterns of communication among a client, switch, and first and second devices.

FIG. 1A illustrates the initial data flow from a client 110 through a switch 120 to a first device 130. In this figure, a switch is serving as the first device and acting as a virtual IP host. Initially, the switch receives a message from the client and selects a device to receive the message from among the cluster devices in communication with the switch. The selection by the switch may be relatively arbitrary, such as a random first available selection, or it may be well-informed, for instance, if the switch is equipped with a pseudo-file system and devices to which messages are routed to NASs. Ideally, the switch would choose the most appropriate device to respond to the message based on a table lookup or other fast protocol. This initial selection function alternatively can be built into the attached devices themselves, instead of the switch.

The function of the primary endpoint or virtual IP address at the switch 120 is to intercept the initial request, open a transport session and decide on the next course of action. Ideally, the primary endpoint function would be integrated into the switch seamlessly to provide transport connection management and packet switching services. If it is not integrated into the switching device, the endpoint forwarding must be performed in software and the primary endpoint process becomes a potential system bottleneck. If it is not integrated into the switching device, a first or third device may process all initial requests to the cluster. Integration into the switching hardware allows switching fabric, once programmed, to forward packets directly to a first or second device, bypassing the processor of the switch.

Figure 1B:
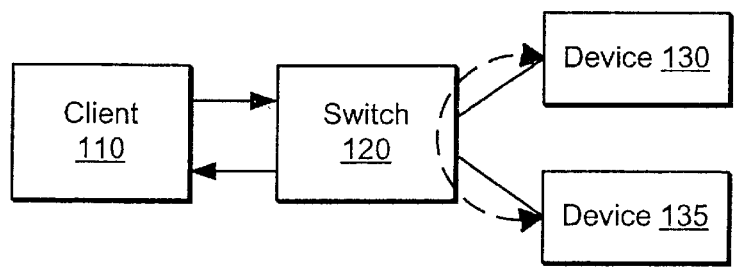

FIG. 1B illustrates communication between the first device 130 and the second device 135 during handoff of the communication session. At one software layer or another, it is necessary for the first device to send one or more handoff messages to the second device. The handoff should proceed only if the second device acknowledges the handoff. Either the first or second device reports to the switch that the handoff has been accomplished. The switch receives a report and updates its forwarding table so that additional messages from the client to cluster device will be routed to the. second device instead of the first device. For reliability, it is important that the switch acknowledge receipt of the message which reported the handoff. The reporting and acknowledging steps of this process may be carried out between the first device and switch, between the second device and switch, or between some other combination of entities. Optimally, a handoff will occur at a point in system activity when the cluster to client communication is relatively idle. This reduces latency in communications with the client. It is also desirable for a handoff to take place quickly enough that no network packets are lost and the client does not timeout waiting for response to messages that it has sent. To prevent the loss of messages, the first device, at the network transport layer, the application layer, or another layer, can buffer messages from the client and forward them to the second device upon completion of the handoff.

Figure 2A:
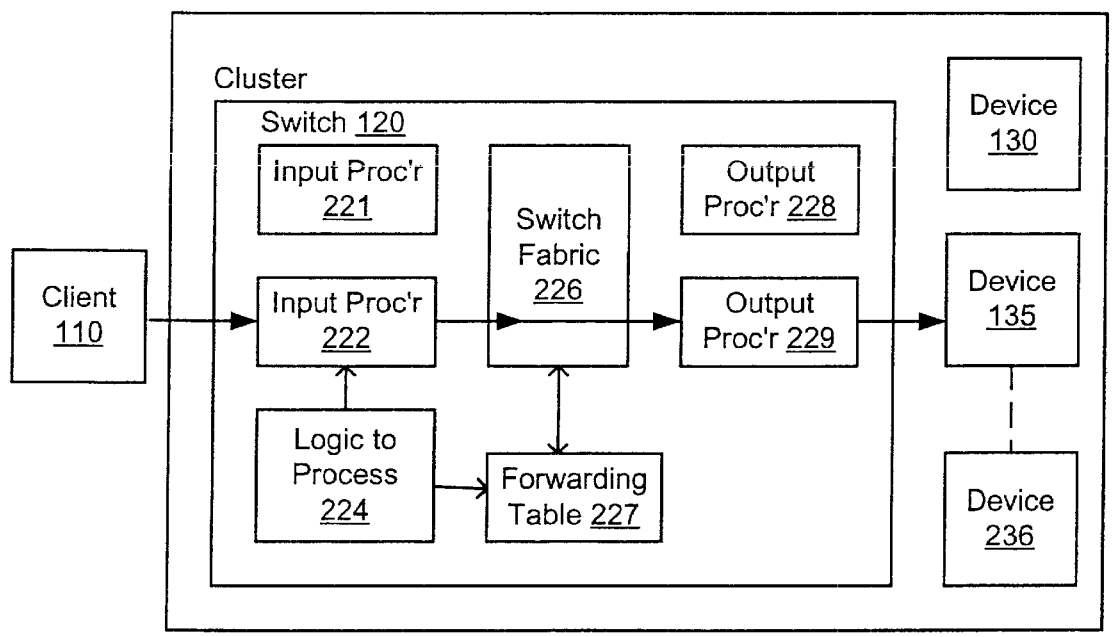
FIGS. 2A and 2B provide additional detail regarding the configuration of a switch and its operation in directing communications between client and cluster devices.

The FIG. 2A provides additional detail on the flow of messages through the switch to the cluster devices. Client 110 opens a connection with cluster by sending a message to the switch 120. The switch 120 includes input processors 221 and 222, logic to process messages from the client 224, switch fabric 226, a forwarding table 227 and output port processors 228 and 229. The cluster consists of the switch 120 and cluster devices 130, 135.and 236 As described above, the cluster devices may be disk drives with file systems, web servers, database servers, networked computing clusters, load balancing servers switches or first devices which aggregate second devices, or any other device which would benefit from clustering. While it is preferred for a switch to route messages among cluster devices by re-programming forwarding tables of the switch, the routing of messages among cluster devices may be shared (e.g., bus), channeled (e.g. fibre channel) or switched, all of which can provide transparency to the client.

Figure 2B:
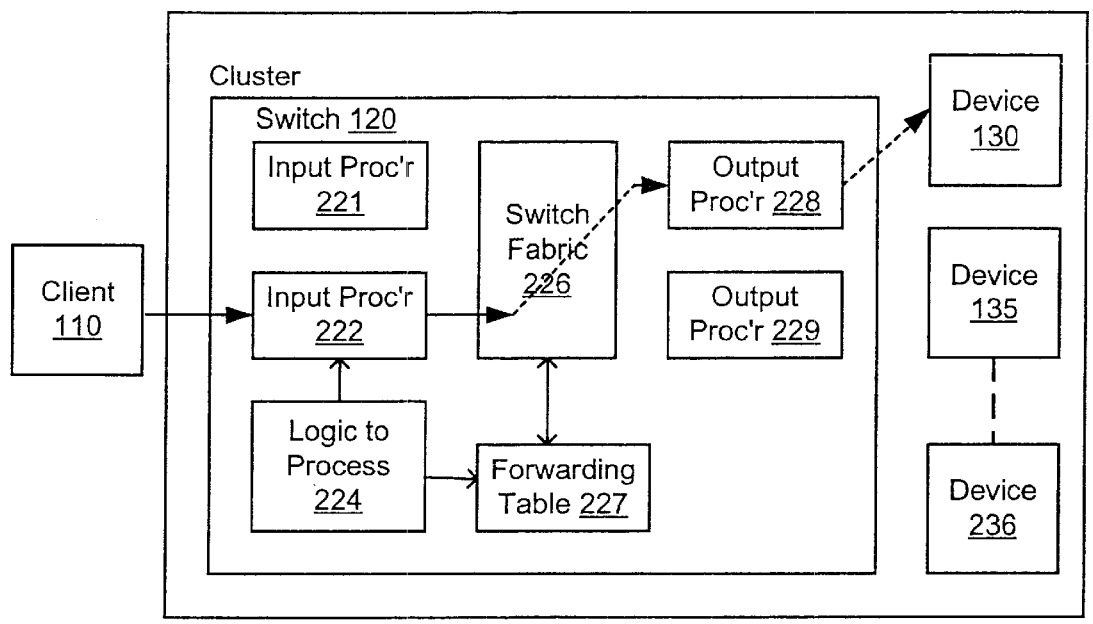

FIG. 2B depicts the result in a handoff from cluster device 135 to cluster device 130. Through the switch fabric 226, messages from the client are directed to cluster device 130, instead of cluster device 135.

Figure 3:
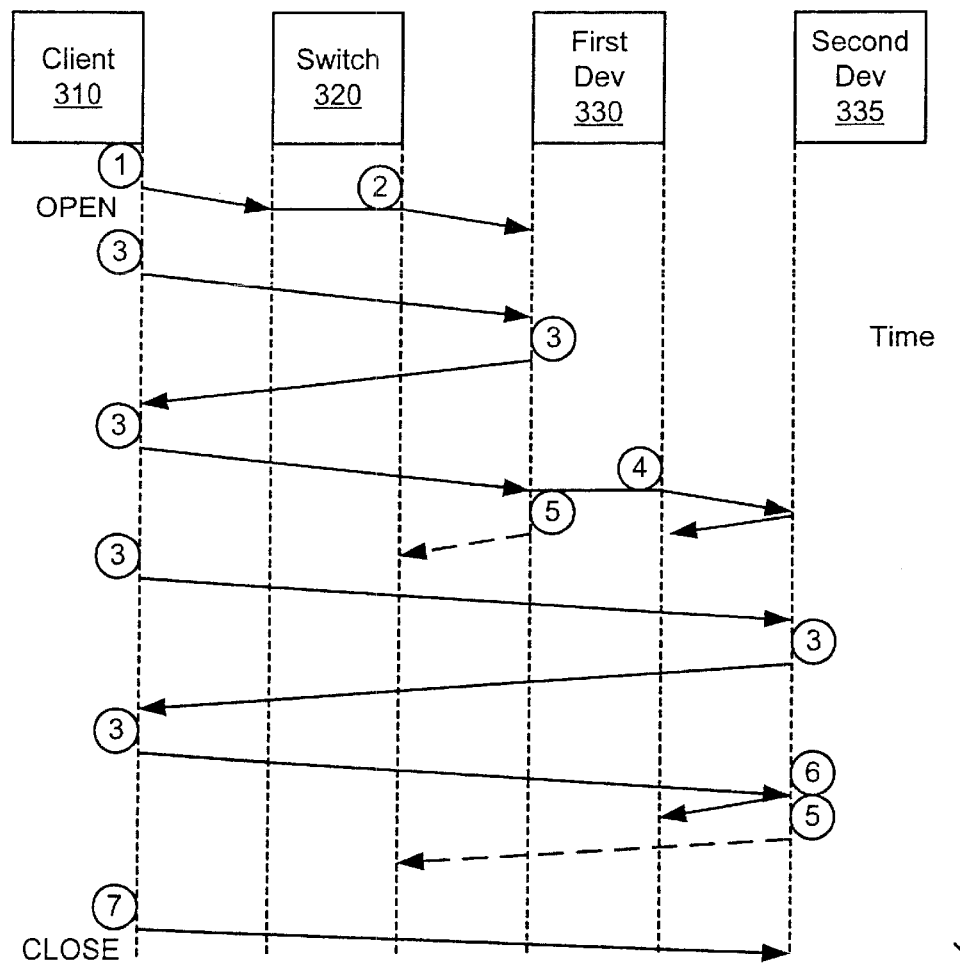
FIG. 3 is a diagram of operations used to implement a transport handoff.

FIG. 3 shows a sequence of operations for accomplishing a handoff. The numbering of blocks in this figure parallels the numbering in prior figures. A session, typically a TCP session, is originated by client 310. The client is in communication with the switch 320. The session begins with communications through the switch between the client 310 and a first device 330. The numbered circles depict the flow of communications. The client opens a transport connection with a virtual IP address of the switch, sending a message from (1) to (2). The connection is either processed by the switch or forwarded to the first device, which may either process the open connection message itself or forward the message to a second device. Assuming the first device opens the connection, the client and first device exchange messages and participate in transactions over a transport session identified by (3). The first device processes transactions in accordance with messages received from the client.

In FIG. 3, at (4), the first device determines that another device in the cluster is better suited to handle the client request, so it initiates a handoff to another device. Either the first device or the switch, or a third device, identifies a second device to which the session should be handed off.

Determination of whether to proceed with a handoff can be based on any of several techniques. The location of data being processed can be used to determine whether the first device is processing a sufficient amount of data to justify retaining connection with the client. A handoff may be determined appropriate once data returned to the client from a location other than the first device has reached a predetermined threshold. More particularly, the determination to initiate a handoff may be made when data returned to the client from a specific other device has reached a predetermined threshold. This determination may alternatively be based on the relative amount of data supplied by the first and other devices rather than a threshold. The workload of the first device and other devices can also be used to determine whether a handoff should proceed, either on the basis of absolute or relative workload. In may be useful to evaluate the location of data being processed in more than one TCP session in order to determine whether a handoff should take place.

Identification of a second device to which a handoff should be passed can be based on any of several techniques. When the first device is a disk drive equipped with a file system including a virtual root directory, the first device can determine from the virtual root directory where the file is located and can identify the appropriate second device. Alternatively, if the first device is a database server, it may be equipped with a table of database objects cross-referenced to the database servers which host objects. A first device can respond to a data object request by looking in the table to determine whether another database server is better suited to respond to the request. When a database request is in the form of a transaction, a table transaction type can be used to determine the appropriate database server. Alternatively, a table of database subsystems can be used. Each of these techniques can be used with a third device, such as the switch or server, when the third device hosts a virtual root directory, table of database objects, table of transaction times, table of database subsystems, or other lookup or indexing resources. When the first device is a load balancing device, satisfactory measures for load balancing may include traffic through the switch, reported workload or available capacity of alternate devices, or analysis of the services being requested.

At (4), handoff messages are communicated through the switch from the first device to the second device. The second device acknowledges the handoff message. This figure depicts the first device reporting the handoff to the switch, at (5), and the switch acknowledges the handoff. The acknowledgment by the switch signifies that the forwarding table 227 has been or will be updated appropriately. Note that either the first device or the second device, both depicted in this figure, can report the handoff to the switch.

Either the first device or the second device can receive the acknowledgment in return. Once the forwarding table in the switch has been updated, the first device terminates its participation in the session. After the handoff, the session proceeds between the client and the second device. The second device is able to return a handoff to the first device (6), if it determines that a return handoff is appropriate. The session continues until it is terminated (7).

Virtual host semantics are significant to the handoff process. The destination port to the virtual host is shared across devices. Virtual host port numbers should be dedicated to communications among devices accessed through the virtual host and those port numbers should not be used for external communications.

One protocol for communications between among the switch and devices is an Extended Addressing Protocol ("EAP"). EAP provides a useful mechanism to redirect a flow of communication, such as a TCP or UDP connection session between a client and server. It is particularly useful when a server is a virtual IP address for multiple devices, such as NAS. The server may be a switch which is assigned an IP address. The switch or other controller is aware of a cluster of devices attached to it opposite the client. It may use NAT or other resources to translate a single controller address into multiple cluster addresses for the clustered devices. Within the cluster, EAP is used to move connections among cluster advices and particularly to advice the switch or other controller to update its forwarding tables to implement the movement of connections. An EAP message may have the following format.

| Version | Operation | Nonce | Protocol | Source Port | Destination Port | Transaction ID | Cluster ID |
|---|---|---|---|---|---|---|---|
| 4 | 4 | 24 | 8 | 16 | 16 | 16 | 32 |

In this format, Version is a four bit field which identifies the protocol version number. Operation is a four bit field which distinguishes between functions necessary to change a connection, such as query, change connection, set or redirect. Nonce is a 24 bit identifier or security token which uniquely identifies a connection participant. Protocol is an 8 bit field, to match the standard IP protocol field. It identifies whether the protocol is TCP, UDP or potentially some other protocol. Source port and destination port are 16 bit port identifiers. Transaction ID is like a sequence number for EAP messages. Transactions other controller responsible for routing messages to devices in a cluster; it may be an IP address or, for cascaded devices, it may be a NAT-assigned address. In some implementations, Cluster ID may be implicit and not separately expressed in the EAP message. For cascaded devices, multiple EAP message may be used. The ordering of the EAP messages may indicate the order in which messages pass through switches or controllers.

EAP messages may be attached to a communication flow as TCP options, IP options, or in a data field. If EAP messages are treated as data, a suitable protocol should be used by the switch or other controller and the cluster devices to assure and acknowledge receipt and execution of directions conveyed.

Additional Detail of the First Embodiment

One way of accomplishing a handoff is by using a man-in-the-middle attack, which is similar to so-called TCP hijacking. We sometimes refer to our protocol as a Transport Connection Handoff ("TCH") session. The protocol presented here is a more systematic and robust form of TCP hijacking.

A handoff of a client TCP session can be accomplished by initiating a TCH session. The TCH session is established between the first device and the second device. The TCH session is morphed into a TCP session by the second device, using state information received from the first device. A TCP handoff is expected always to work when the following state information is transferred: client (source) IP address and cluster (destination) IP address; client and cluster port numbers; TCP sequence and acknowledgment numbers; and transmit and receive window sizes. During the morphing process, switch forwarding tables are updated. The second device duplicates the original TCH session and immediately terminates it. The first device terminates its participation in the client session without sending any FIN message to the client, as if the session is not finished from the client's perspective. The morphing is complete when the first device has terminated its client session and the second device has terminated the TCH session. Morphing may include transfer of application state information, in addition to TCP session state information. Before the handoff of a TCP session is described in greater detail, it is useful to understand some novel logical indicators and data option fields.

Figures 4A, 4B:
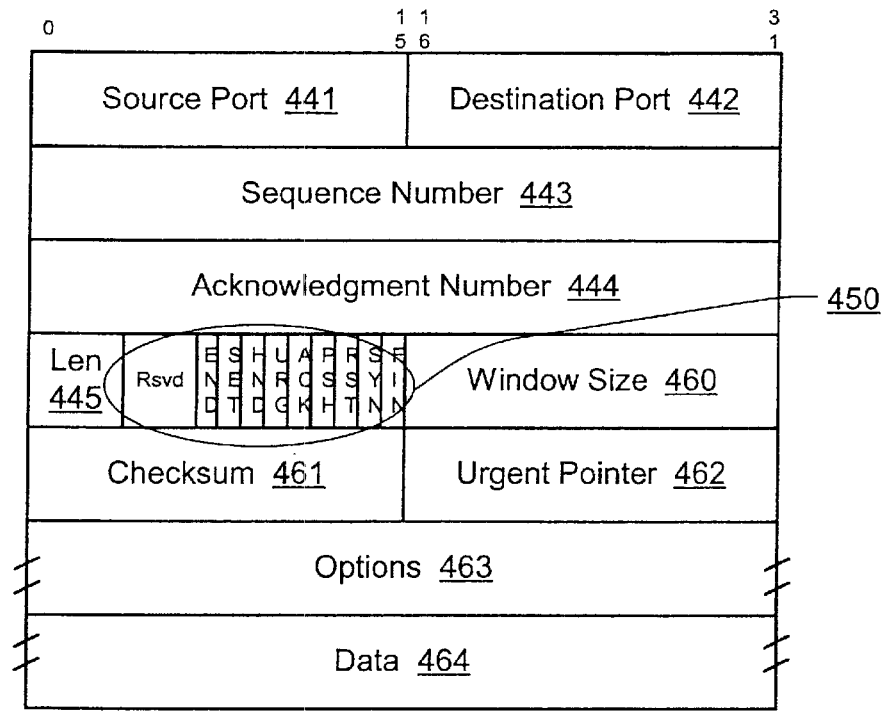
FIGS. 4A and 4B illustrate data structures useful for one embodiment of the present invention.

FIGS. 4A and 4B illustrate extensions of the TCP protocol which embody one mechanism for accomplishing a handoff. One skilled in the art will recognize that these extensions, illustrated in the context of TCP session, can be applied to a UTP session or any reliable or unreliable transport protocol. In FIG. 4A, the fields illustrated are: a source port 441, a destination port 442, a sequence number 443, an acknowledgment number 444, a length field 445, a series of logical indicators 450, a window size 460, a checksum 461, an urgent pointer 462, a variable length options section 463, and a data section 464. Among the logical indicator flags, typical TCP session flags may include FIN, SYN, RST, PSH, ACK, and URG. For purposes of establishing a TCH session, three logical indicators may be added: HND, to indicate that this message is part of a TCH session; SET, to force a handoff; and END, to indicate completion of the handoff. These logical indicators are explained further after the data structures illustrated in FIG. 4B are explained.

FIG. 4B illustrates two new TCP options, the TCH endpoint and update options. The option kind values 255 and 254 in fields labeled 471 and 481 are temporary option numbers, as permanent option numbers need to be assigned by IANA. The endpoint option is used to transfer information about the client session from the first device to the second device. This information includes the client source port and IP address, which originated with the client labeled 110 and 310 in prior figures. Whenever the HND flag is set in messages from the first device to the second device, the endpoint option should be used to include the indicated data. When used, the endpoint option includes a message type or kind field 471, a length field 472, a client port field 473, and a client IP address field 474. The endpoint option should only appear when the first device sets the HND flag. It should not appear in any other message for the first device and it should never appear in messages from the second device.

The update option is used to transfer information about the sequence and acknowledgment numbers to use during the connection morphing process. It is not used in the TCP headers used by the TCH session between the first and second devices. Whenever the SET flag is used in messages from the first device to the second device, the update option should be used and include the indicated data. When used, the update option may include a kind field 481, a length field 482, a sequence number field 483, and an acknowledge number field 484. The update option should only appear when the first device sets the SET flag. It should not appear in any other message from the first device and should never appear in messages from the second device. Note that the 4-bit length field in FIG. 4A is to be set to the correct value and TCP options are to be terminated with an option of type 0. The update option should be preceded by two NOPs of kind =1 to ensure that the fields are 32-bit aligned. Further note that as with a normal TCP session, unrecognized options received by either the first device of the second device are to be discarded.

Other state data which might be forwarded to enhance TCH sessions includes timer related operations, such as last RTT and slow start timers, last transmitted segment and timer information, last received segment and timer information, keep alive timer, retransmission timer, persist timer, delayed ACK, and maximum segment size (MSS) options. This state data and other currently defined TCP options may be passed from the first to the second device, if desired. With this description of state data and option fields in mind, the use the logical indicators should be apparent.

The HND flag is used to indicate the message is part of a TCH session. It should appear with all SYN messages returned by the second device, otherwise it is assumed that the second device does not support a TCH session. The first device should send only one endpoint option and should send the endpoint option with the message that includes the HND flag. Failure to include an endpoint option with the HND message is interpreted by the second device as a connection failure and a RST flag is sent with the response message and the connection terminated. The endpoint option is used to provide the client IP address to the second device (not IP address of the first device.) The second device should never use an endpoint option. If the first device receives an endpoint option from the second device, it is to ignore the endpoint option.

The SET flag is used to perform the actual connection handoff. The semantics of using a set flag are similar to the use of a SYN flag in a normal TCP session, except that simultaneous SETs cannot occur. The first device should only send one update option and it should send the update option with the message that includes the SET flag. Failure to include an update option with the SET message is interpreted by the second device is a connection failure and an RST flag is to be sent with the response message and the connection terminated. The update option is used to provide the current sequence acknowledgment numbers for the session between the first device client. The second device should never send an update option. If the first device receives an update option from the second device, it is to ignore the update option.

The END flag serves the purpose similar to an ACK flag in a normal TCP session. A separate flag is used because the ACK is used to acknowledge data transfer. It may not be possible to distinguish in this context between an acknowledgment of data transfer and acknowledgment of TCP state information transfer, so there an additional flag is preferred. Messages containing the END flag should be sent only by the first device and not by the second device.

Figure 5:
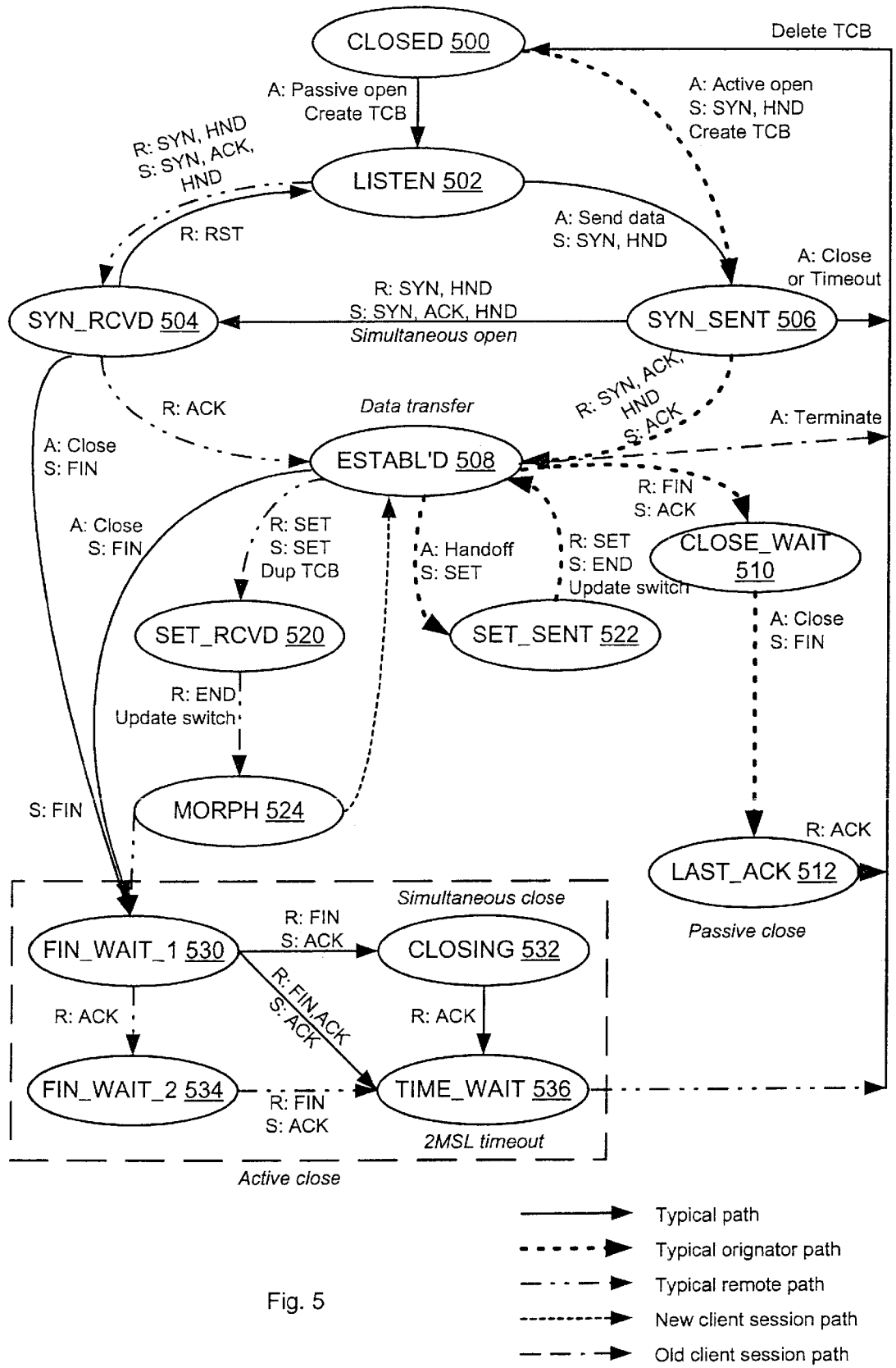
FIG. 5 illustrates state transitions during handoff for one embodiment of the present invention.

FIG. 5 is a state diagram which shows additional states not ordinarily used in a TCP session which support a TCH session. Typically, the client establishes a TCP connection through the switch with the first device. In the five-tuple which uniquely identifies a TCP session, the destination port PI is associated with the first device and the source port P2 is associated with the client. Consistent with FIG. 3, an application running on the first device initiates the handoff.

It may identify a second device by its own means or it may communicate with a third device to identify a second device to which to pass the handoff. The second device is identified and a TCH based TCP connection is opened. The application running on first device creates a socket with the same destination port P1.

Most of the states and flags illustrated in FIG. 5 will be familiar to those who have experience with TCP workings. The additional states added to support TCH sessions include SET_RCVD 520, SET_SENT 522, and MORPH 524. Additional flags and TCP options relevant to FIG. 5 include those discussed above. Additional states are supplied to provide a reliable transport mechanism for application protocol state information. TCP hijacking does not provide such a reliable transport mechanism. TCH provides reliability through the use of standard TCP functionality. This TCP functionality allows the first device to stimulate the client during transfer of application protocol state information to the second device. These protocol modifications are less likely to be required. The first device may set up a number of different TCH sessions with different candidate second devices, predictively anticipating the need for a future handoff. The actual handoff does not occur until the SET operation is performed. The SYN flag customarily used in TCP sessions does not provide the same functionality because use of a SYN flag could result in generation of a duplicate SYN packet which a TCH session would be unable to handle. As only a first device can initiate a handoff, is not possible for simultaneous SET packets to be generated.

A sequence of packet exchanges between the first and second devices is defined to ensure that the first device knows that the second device has completed a handoff. It also assures that the second device does not attempt any failure recovery. A handoff begins with the first device in an ESTABLISHED 508 state, that is after the TCP connection (SYN handshake) has been established. After a handoff is complete, the TCH session is terminated. The sequence of packet exchanges leading to determination of the TCH session is: first device sends SET; second device sends SET; first device sends END; second device sends FIN; and first device sends FIN. This exchange is apparent in FIG. 5. Note that both the SET_SENT and SET_RCVD states have defined exit conditions. As in the normal operation of TCP state machine, if the exit conditions for the states are not met, the packet which set up the current state is retransmitted.

The SET_SENT state 522 applies to the first device which is originating the handoff. The first device preferably calls a setsocketopt function with the flags at a nonzero value, causing a SET packet to be sent. At the same time, the first device enters the SET_SENT state. The first device suspends processing of TCP message in the client session. The messages may be buffered and are not be submitted to the application layer. Alternatively, if incoming packets are discarded, the reliable transport properties of TCP will cause the discarded packets to be retransmitted. If the second device does not respond to the SET packet before the TCP retransmitted timer expires, the SET packet is resent. If the SET packet is received from the second device, then the switch is reprogrammed and the first device sends an END packet. When the END packet is sent, the first device transitions to the ESTABLISHED state. While the first device is waiting for a FIN packet, it should not process additional message packets. Upon receiving a FIN packet, the first device closes its copy of the session with the client, but does not send an FIN packet to the client, because the session in is still alive from the client's perspective. The first device transitions directly to the CLOSED 500 state. The setsocketopt function preferably is used to accomplish this transition. If a failure is detected in the TCH session, and application program running on the first device can recover by calling the setsocketopt function with the flags at 0. This will remove the suspension and data transfers can proceed as normal. Regardless of function calls by an application program, if the client communicating with the first or second device closes its session, the TCH handoff session also must be closed.

The second device responds to a SET packet from the first device by transitioning from the ESTABLISHED 508 state to the SET_RCVD 520 state. All application data transfers are suspended—this may require some coordination with the application layer program, depending upon the application protocol that is in use. As the second device transitions, it sends a SET packet and an ACK. The first device transmits data to the second device using the endpoint and update options. The second device uses the endpoint and update option data to create a duplicate TCP control block (TCB) that will be morphed into an active TCB when the second device receives the handoff. The original TCB is used to terminate the TCH session.

The second device, while in the SET_RCVD 520 state, will retransmit SET packets until it receives an END packet from the first device. When the END packet is received, the second device will transition to the MORPH 524 state. At this point, two TCBs will be in use, one for the original client session and the other for the TCH session. At this time, the device which forwards messages to the first device and second device, such as a switch, can be updated, such as by reprogramming a forwarding table. The second device is free to communicate with the client in the original client session without further involvement of the first device. For the TCH session, the second device transitions from the MORPH 524 state to the FIN_WAIT 530 state and sends a FIN packet.

The application program interface (API) adds a number of new socket options to supports a TCH session. These options can be set or examined using the standard BSD socket setstockopt and getsocketopt functions. The option SO_HND enables or disables the TCH socket. The enable precedes opening of the socket, when a socket descriptor is passed as a parameter. The socket descriptor is used by the kernel to retrieve the proper information for an endpoint TCP option. The disable closes the socket, when a value less than zero is passed as a parameter. The SO_SET option is set to force a handoff. It will be sent when a handoff has occurred. The SO_TIMER option may be used to optimize for any timers set by the first device, when timer information is forwarded. The SO_STATE option may be used to optimize for first device state information, such as window, MSS, etc. The SO_IPTOS option can be used to set the IP TOS value. The SO_TERMINATE option can be is to terminate the client TCP session.

Additional Detail of the Second Embodiment

Figure 6:
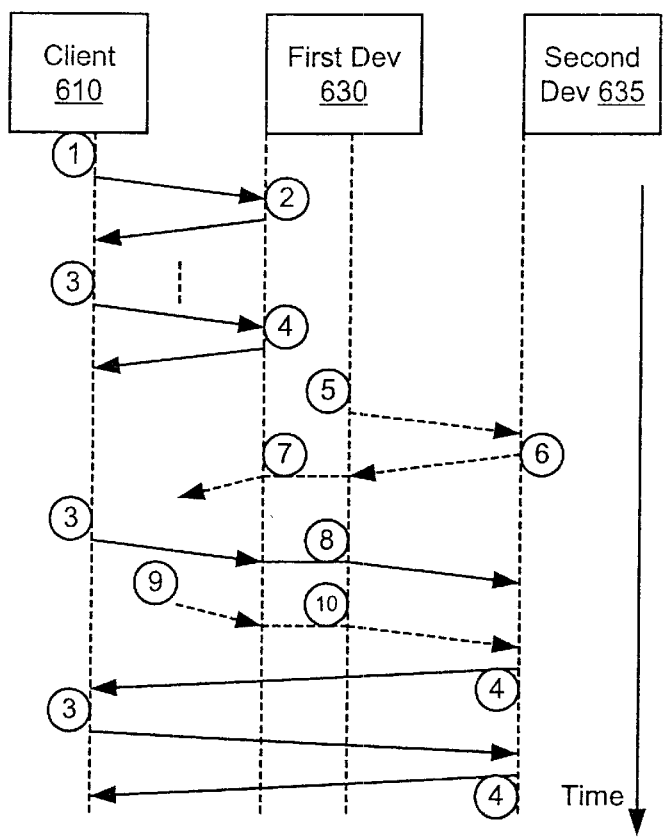
FIGS. 6–8 illustrate full and half-handoff operations for a second embodiment.

A second embodiment of the present invention may offer a richer set of features, such as half-handoffs, predictive set up of TCH sessions and buffering of messages received during the latency period of processing a handoff. This description of the second embodiment focuses on additional features without repeating features described above. FIG. 6 shows a sequence of operations for accomplishing a full-handoff according to the second embodiment. The numbering of blocks in this figure parallels the numbering in prior figures. The session, typically a TCP session, is originated by client 610. The client communicates through a switch, which does not have a separate column in this figure. The session begins with communications through the switch between the client 610 and the first device 630. The numbered circles trade the flow of communications. The client opens a transport connection with virtual IP address, resulting in a message being sent from (1) to (2). A TCH session handoff will not take place during the connection setup phase of the underlying TCP session or during the tear down. The first device responds to a client open primitive message by acknowledging it, from (2) to (3). Under TCP, one or more handshakes are required to ensure that the session is operational. Transfer of data from the client to the first device is indicated at (3) to (4). The data sent by the client may change the first device's acknowledgment pointers, window sizes and timers. The first device is sending data to the client at (4). The first device's packets may change the relevant sequence numbers, window sizes, and timers. At (5), the first device determines that a connection handoff is required. As discussed above, the mechanisms for making this determination include the location of data, statistical analysis, etc. The first device, by itself, or in cooperation with a switch or some other device, identifies an appropriate second device to which a handoff should be initiated. The first device sends a handoff message, from (5) to (6), which includes state information about the session. Once this handoff initiation message has been sent, the first device will not send the client any new data. At (6), the second device acknowledges the handoff message, thus informing the first device that it can handle the session. All further client communications in this full-handoff scenario should go to the second device. Before this acknowledgment is received by the first device, the client may have sent additional packages which the first device should buffer and forward. The buffering and forwarding are not shown in FIG. 6. To avoid performing relays, the first device informs the switch (not shown) that it should update its forwarding tables and direct additional messages in the client session to the second device. This operation may take some time and the first device may still be receiving data which it will need to forward to the second device. The first device forwards client packets (8) to the second device in the order that they were received. Note that it is possible that the second device will receive one or more packets out of order, as there may be a small window of time in which both the first device and the switch are forwarding packets to the second device. If necessary, this window of time can be reduced by reducing the window size for messages and thereby slowing down client data transfers. At (9), the switch acknowledges that its forwarding tables have been updated. This completes the handoff process. At (10), the first device relinquishes the session by indicating to the second device that the handoff is complete. From this point on, the second device takes over the original role of the first device. FIG. 6 does not show the connection close step.

Figure 7:
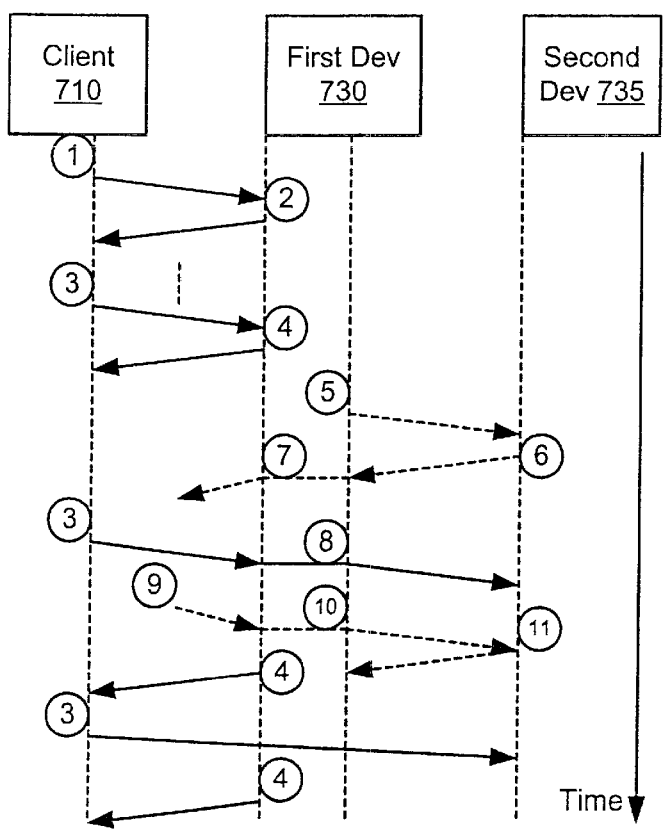

FIG. 7 illustrates a half-handoff in the client direction as an alternative to a full-handoff. Several of the steps for this half-handoff are the same as for a full-handoff. Accordingly, only the differences are described. Labels (1) through (4) involve the same operations as for a full-handoff. At (5), the first device determines that a half-handoff should be used instead of a full-handoff. By itself, or in conjunction with a switch or other device, the first device will determine the appropriate second device and inform and the second device of the handoff. Only the client's sequence numbers, window information, and timer information need to be sent to the second device. Because this is a half-handoff in the client direction, the first device will continue to transfer data to the client. However, it will not know that the client has received the data that it sends unless the second device informs it of the current acknowledgment numbers from the client, as at (11). At (6), the second device acknowledges the handoff in the client direction. At (7), the first device advises the switch (not shown) that the handoff has occurred. Until the switch has completed updating its transfer tables, the first device may need to buffer or relay packets received from the client to the second device. This may be the case until the switch has, at (9), confirmed that its forwarding tables have been updated. At (10), the first device informs the second device that it has received an acknowledgment from the switch. At this point, the half-handoff in the client direction is complete. To ensure that the half-handoff works correctly over a long period of time, the second device passes to the first device current acknowledgment numbers from the client. The second device also needs to provide error recovery information to the first device, as the first device is the only device that can communicate with the client. This type of half-handoff may be particularly useful when there is a large amount of data to return to the client and transaction processing times are long. This half-handoff allows the client to start a new transaction on the second device while the first device is still returning data.

Figure 8:
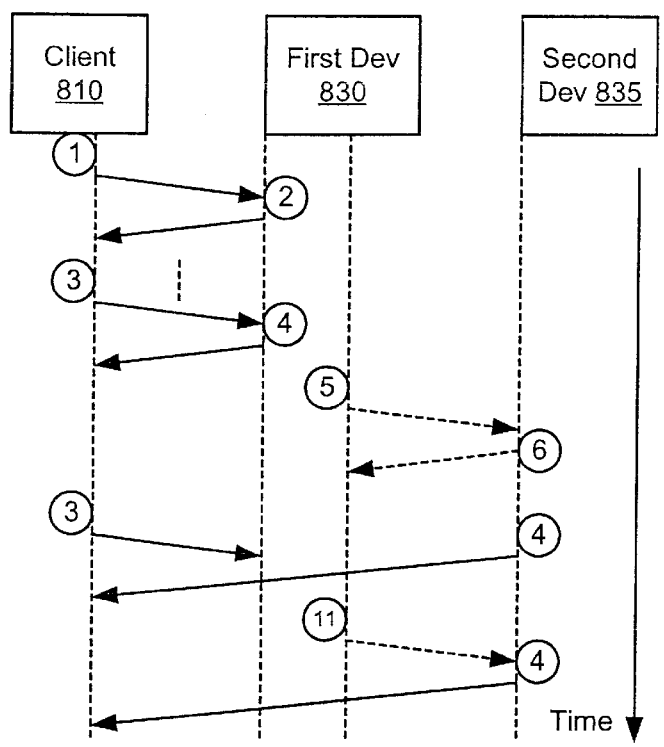

The other type of half-handoff, for the cluster to client data path, is shown in FIG. 8. This type of half-handoff is illustrated for symmetry. Several of the steps for this half-handoff are the same as for a full-handoff. Labels (1) through (6) are the same as for a full-handoff. Because of the type of half-handoff involved, there are no labels (7) through (10). The first device continues to receive data from the client, but cannot send acknowledgments the client, so the routing of acknowledgments follows the path (11) to (4).

In some instances, a second device may desire to request a handoff. The second device may request a handoff, for instance, when in-line processing is supported by the application protocol running on the second device. However, such a request should only be made when a large amount of data needs be transported to the client. Otherwise, the. data can simply be relayed through the first device for transfer to the client.

One aspect of the second embodiment is a capability to trigger automatic notification of second devices which are potential transfer endpoints, once a virtual host connection comes into existence. The set up of TCH sessions can begin before the TCP connection has been fully established with a SYN handshake.

A connection can be closed by the client at anytime in a TCP or TCH session. Thus, it is preferred to have a mechanism that informs first and second devices participating in handoffs that the client has closed a session. Similarly, attached devices can initiate a connection close. If either device participating in a handoff has sent or received a FIN packet closing the connection, the handoff is to be aborted.

During a connection handoff, the second device can either receive the current values of TCP connection timer(s) or initialize its timers to zero, thereby extending any timeout. Preferably, devices in a cluster will be synchronized to a single clock so that timer references are easily reconciled.

The present invention may include a mechanism to determine which host or switch is routing messages to the first device and what MAC address of that host or switch is. This mechanism may be DHCP or another stateful configuration-based mechanism across which virtual IP address information is transported.

Because accounting information may be important for remote management of a network, provision should be made to ensure that TCP statistics for virtual devices are correctly recorded and recorded in a reasonable time. At a minimum, SNMP related information should be passed between devices. The BSD-based TCP state data structure can be used to pass standard information.

Vendor and application software should be provided with an interface that allows transmission of data among devices. Vendors often have proprietary data structures which may need to be forwarded. A capability negotiation feature may be preferred to permit the devices in a cluster running applications from different vendors to determine what support is present in the cluster.

In general, low latency during the initial handoff is preferred. The first packet establishing a TCH session preferably should be capable of transferring sufficient state information for the handoff to proceed. Alternative packet limitations which might be considered are the 1500-byte Ethernet payload and the IP 576 byte minimum packet. It may be preferable to use the TCP PUSH for packets designed fit the 1500-byte Ethernet payload. Hardware systems may be used to achieve low latency. Hardware implementation considerations may include use of 32-bit aligned words and relatively simple protocols. Predictive mechanisms may be used to further reduce latency. An implementation the present invention to define some predictive mechanisms will be extensible to include other predictive mechanisms.

Figure 9:
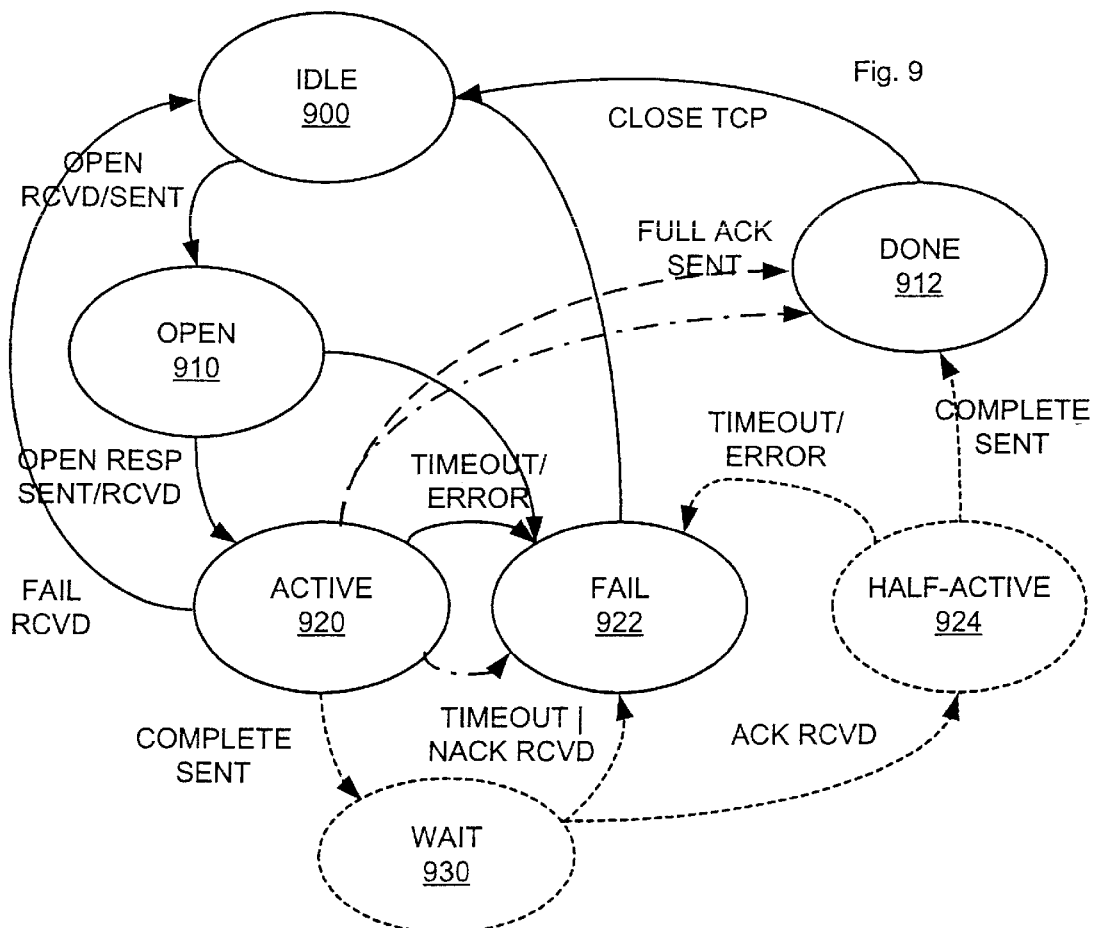
FIG. 9 illustrates the state transitions for a second embodiment.

FIG. 9 is a TCH state transition diagram for first and second devices. Minor state transitions have been omitted for clarity. Short dashed transitions and states apply to the first device. The long dashed transitions apply to the second device. The dot dash transitions are used by handoff requests. The system should track the current state and type of handoff that was originally initiated. By definition, the handoff proceeds from the first to the second device. The system starts in IDLE state, waiting for a TCH session to be established. The first device (or for handoff requests, the second or other devices) will send an Open packet which will be received by the second device. Both the first and second devices should transition into the OPEN state. In this state, a timeout will cause the session to be aborted and result in transition to a FAIL state. The FAIL state causes a Fail message to be sent and the process to terminate the TCP session. The second device will send an Open Response packet after a transition to the OPEN state, to be received by the first device. Both devices should transition to the ACTIVE state. If a handoff was requested in the Open packet, then a "Complete" message is to be transmitted by the first device and a transition should proceed to the WAIT state. The second device responds to a Complete message with an Acknowledgment. The HALF ACTIVE and WAIT states apply the first device.

The sequence above varies for predictive handoffs. The system stays in ACTIVE state, sending and receiving message packets. If messages are not sent periodically, a timeout occurs causing the system to assume failure and a FAIL state. Alternatively, this timeout feature can be disabled. For handoff requests initiated by a second device, the handoff type automatically is changed to predictive and an ACTIVE state is assumed. If a predictive session is no longer needed (such as when the handoff is given to the different device), then the unused predictive TCH session should be terminated with a Fail. For handoff requests initiated by another device, not the first or second device, the state is immediately changed to DONE or FAIL, shown by the dot dashed lines. If the request by the other device is denied, the FAIL state is assumed. Otherwise, in the DONE state success is implied. However, this does not mean handoff will occur. This simply means that the TCH system was successfully initiated.

In the ACTIVE state, messages that can be received include Updates, Fail, Done, Handoff or Complete. Receipt of a FAIL message terminates a session, without the necessity of a response, and returns the device to the IDLE state. In the ACTIVE state, DONE messages should only be received after a handoff request by another device, other than a first or second device. Otherwise, the DONE state should only be entered from the WAIT state. Updates are processed or ignored without a response. Handoffs are processed, but not ignored, without response. For a handoff to be completed, a Complete message should be sent. The Complete message corresponds with the state transition to the WAIT state, with the device simply waiting for an acknowledgment of a Complete message. Return of a Fail message indicates that the other device was unable to complete the handoff and fail or recovery steps must be taken. A timeout in the WAIT state causes a transition to the FAIL state and recovery steps must be taken. An acknowledgment changes the state to DONE for full-handoff into the HALF-ACTIVE state for half-handoff.

The HALF-ACTIVE state is similar to the ACTIVE state, but applies when half-handoff is in place. A Complete message sent by a device in the HALF-ACTIVE state must be acknowledged. Receipt of an Acknowledgment leads to a transition to a DONE state. In the DONE state, a Done message is sent and the connection is closed.

Predictive mechanisms are favored to eliminate latency during both the initial state set up and the programming of the switch forwarding tables. Predictively setting up a TCH session requires transfer of TCP state information. When a handoff is actually requested, the TCP variables merely need to be updated, particularly sequence and acknowledgment numbers, for the handoff to take place. The switch can be preprogramed immediately if the second device is capable of buffering messages received before the handoff takes place and returning them to the first device if no handoff actually takes place. To minimize the amount of information that needs to be buffered, the first device can decrease the size of the TCP window, approaching zero size. The data flow begins again when the window size is increased.

Three kinds of packets are included in the TCH protocol. They are an Open packet, an Open Response packet and a Message packet. The Open packets are special packets designed to facilitate quick handoffs. The Message packets are used for predictive handoffs, slower buffer-transfer handoffs, and updating of optional data structures for handoffs.

Third Embodiment

A description of a first device and NAS combination which benefit from the handoff of a TCP or UDP file session follows, with reference to FIGS. 10–13.

Figure 10:
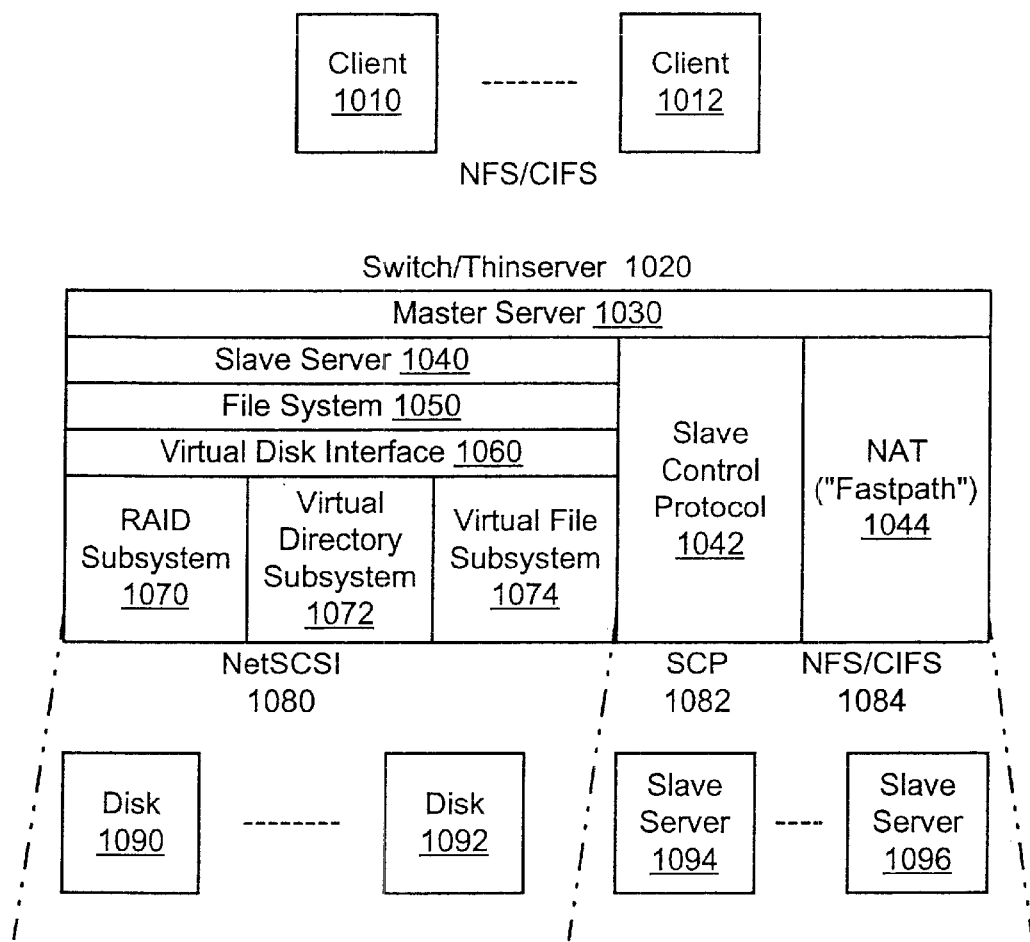
FIG. 10 is a block diagram of one embodiment of the present invention, depicting hardware aNd software components.

A block diagram of a Master/Slave (first server/second server) embodiment of the present invention is shown in FIG. 10. The switch has an extra processor that is used to support a thinserver (preferably a stripped down UNIX file server) and NAT functionality. It also has subsystems to support storage aggregation, all which run under a local slave server. The clients 1010–1012 communicate in file sessions with the switch functioning as a thin server 1020 to access disks 1090–1092 and disks associated with slave servers 1094–1096. The client modules may view the storage of the present invention in accordance with an NFS or CIFS file structure model or any similar file structure model. In some implementations, different clients may view the storage of the present invention in accordance with differing file structure models. The switch functioning as a thin server 1020 comprises several logical layers. There are two distinct subsystems in the switch. One subsystem is the master server that controls all disk activity. The master server layer 1030 communicates with both an onboard slave server 1040 and separate slave servers 1094–1096. The master server comprises as a pseudo-file system server that incorporates NAT functionality and ensures that all slave disk servers have a consistent view of the file system. It is important to ensure that cross-disk operations, if they occur, appear to execute within one contiguous file system. Separate, commercial off-the-shelf ("COTS") components are used to ensure that policy information is uniformly used on all slave servers in the system. Each separate disk is controlled by a separate slave server running on the disk. Access to the slave server is fastpathed using L2 NAT-type technology. Ideally, the L2 NAT functionality is provided by the switch fabric. Client NFS and CIFS packets are sent directly to the slave server, bypassing the master server. System coherency is maintained using the Slave Control Protocol (SCP) and COTS policy servers such as NIS.

The other subsystem is a slave server on the switch that controls the storage aggregation functions. This architecture also makes the aggregation of several switches straightforward as the switch is considered a slave server. To communicate with the separate slave servers, the master server uses logic to implement a slave control protocol 1042 and logic to implement network address translation 1044 which puts packets destined for slave servers on the fastpath. The protocol for communication with slave servers includes a slave control protocol 1082 and alternative file access protocols 1084. The onboard slave server 1040 comprises several layers of software. A file system 1050 is linked to a virtual disk interface 1060. The virtual disk interface may interact with a RAID subsystem 1070, a virtual directory subsystem 1072, a virtual file subsystem 1074 or other subsystems that are similar in nature. The protocol for communication between the onboard slave server 1040 and network attached disks 1090–1092 may be SCSI over IP 1080 or any other suitable protocol. As illustrated, both network attached disks and separate slave servers may be devices separate from the switch and preferably are devices capable of autoconfiguration.

The NFS and CIFS file structures supported by the present invention are industry standard file structures. NFS is a stateless system that can use TCP or UDP. The default is to use TCP and to fall back to UDP if TCP is unavailable. CIFS is a stateful protocol that can use UDP or TCP. In practice, however, no UDP implementation is known to exist. It is anticipated that TCP-based protocols will provide better performance, especially over WAN connections. TCP has the benefit that if the client fails, the server can immediately release client resources and vice-versa if the server fails. TCP performance features (slow start, queuing priority, etc.) can be enhanced utilizing a Border Gateway Protocol (BGP)-style usage of TCP or other commonly used approaches. CIFS is a much more complex protocol than NFS, which supports extended attributes and passing of device input/output control (IOCTL) information.

A significant feature of a Master/Slave NAS architecture is that it maintains the appearance of one contiguous name space to one or more clients. If the client is traversing directories and each directory resides on a different disk, the client does not know that it is accessing two physical devices. Two alternative embodiments of the present invention to support transparency to the client. One is to have the master server intercept client requests and redirect them to the appropriate disk. The other is for all the disks have a same consistent view of the file system—in other words, each disk has a copy of the root file system structure. The first approach adds overhead to the master server and has the likelihood of redistributing the client datapath such that the server must take a more significant role. The second approach requires a separate protocol to ensure that changes to the root file system are propagated to all the disks in a timely manner. Each disk preferably as synchronized to a common clock running on the server. Synchronization can be accomplished via a slave control protocol (SCP).

Another aspect of maintaining a uniform file system is to propagate user and policy changes to the disks in a timely manner. It is anticipated that this can be accomplished through the use of NIS/NIS+ or WinNT based Primary Domain Controller (PDC) functionality. Again, a master server is run on the thinserver and separate slave servers are run on disks. For long-lived client connections, if the policy information changes, it is up to the slave server to enforce it.

A variety of security models can be implemented with the present invention The specific logic used will depend on the choice of the file system used in the back-end system. The security models used by UNIX and NT differ in their capabilities. UNIX systems have a finer-grain disk resource exporting model than NT, which is a positive situation. UNIX systems allow host and user-level exports. Windows NT authentication is based on user logins on to validated hosts. NTFS has more access control/attribute features that most UNIX-based file systems. This is typically handled in UNIX systems by creating an overlay system where attributes are stored in a user-level database. The logic of the present invention to implement security is adapted to the file system chosen for the back-end.

Cross-disk operations are those operations that require disks to transfer data to another disk. Because of the layering model used in traditional operating systems, cross-disk operations do not occur as they are typically a higher-layer function. However, performance gains can be made in the present invention from having the disks or a switch perform these cross-disk operations instead of having the client perform these operations. If a client performs the operation, then two data transfers and two connections must be used. If the disk performs the operation, one data transfer and two connections (one to the client and one from disk to disk) are used. Again, the semantics should be that, to the client, the separate disks appear as one logical disk and the back-end system ensures that cross-disk operations are seamlessly executed.

An example of a cross-disk operation is copying a file from one directory to another, which will require special handling if the directories are on different disks. If they are on the same disk, the underlying file system on the disk handles the copy operation transparently. On different disks, two alternative.logics can be used. One is to mount the other directory to the current disk and have the underlying file system perform the copy. The other is to have the disk directly copy the file itself using a separate protocol. The former is the easier strategy, though in incurs some overhead. A simplifying assumption is that all disks can be trusted (they have "root" access) and that all these operations are performed using NFS. The source disk is considered an NFS client and the destination disk is the NFS server. One aspect of the present invention, due to all disk servers in the back-end system having a consistent view of the file system, is that this optimization can be carried out without fear of loops, contrary to the NFS specification which specifically prohibits this type of unified client/server behavior.

Another type of cross-disk operation is one that requires a change in the client endpoint from one disk to another disk. While the present invention includes resources to change the client endpoint, it is preferable to minimize the transfer of endpoints as transfers result in significant disk CPU overhead, additional network utilization, and increase in latency for the client. For example, consider a client accessing directory information or other file system metadata on a different physical disk while the client's working directory is the current physical disk. In this case, an endpoint transfer to another disk and a return back to the original disk for one directory operation would be inefficient. A preferred model is to have the original disk access the directory or metadata on behalf of the client by performing a NFS attribute fetch for the client. This implementation is preferred as disk metadata access is traditionally a large percentage (50 to 80 percent) of all client requests. When the client's working disk changes, then the endpoint should change. This requires some additional processing for the disk to determine if the working disk changes and requires processing resources to perform requests on behalf of clients. Some CPU requirements are reduced by the assumption that all disks can be trusted.

An important aspect of the Master/Slave embodiment of the present invention is that the connection endpoints are moved around within the back-end system. In other words, the client is redirected to another disk in the same back-end system, while the back-end system appears as one virtual IP host to the client. Moving connection endpoints for UDP is implemented using Network Address Translation (NAT) functionality (at layer 2 or 3, depending on the implementation). This is easily handled with programmable tables in the switch hardware. Moving connection endpoints for TCP is significantly harder. A TCP handoff involves transferring TCP state information from the server to a disk, a disk to a disk, or a return from the disk to a server. This is transparent to the client. TCP is a duplex and reliable protocol. TCP handoffs may occur for the entire duplex connection or a simplex connection (one direction). The later is referred to as a "half-handoff." Reliability is afforded using state information shared by the client and the server. The server state information is copied to the new endpoint without the client's knowledge. The TCP state information that is transferred includes the TCP acknowledgment and sequence numbers. Other information may be transferred to improve the performance of the system and to provide transparency to system management tools such as SNMP. This information includes current timer values and TCP statistics. The goal in TCP handoff is to ensure that the latency is low enough that clients do not need to retransmit packets for the TCP handoff to work. Marginally increased latency in "server" response is acceptable. The client retransmits are a function of TCP itself when an error occurs in the network. A number of mechanisms to handle this are discussed in the concurrently file application. Since intelligent disk systems are capable of making requests on behalf of clients, the present invention can function without TCP Handoff support. However, TCP Handoff support provides improved performance and supports load balancing features.

Load balancing, in this context, refers to networked devices which can share a work load, for instance, two or more servers. The present invention supports load balancing in initial load assignment and shifting assignments. The switch may use any conventional load balancing algorithm. It make an intelligent initial selection among devices sharing loads, such as based on analysis of traffic through the switch, content of messages from the devices that are sharing the work load, or analysis of the content being sought. The message from work load sharing devices may report their work load or availability, taking into account varying capacity of devices. Silence or chatter from a networked device may be observed as a symptom of device failure and unavailability to share workload. The switch and TCH Handoff protocol support reallocation of workload among networked devices after it has been assigned. Devices may communicate with the switch, directly between themselves, or by broadcasting to other devices within a cluster of networked devices. Messages useful in load balancing may describe the status, availability or workload of particular networked devices.

The initial connection from the client can be handled in more than one way. It can go to a master NFS or CFS server on the thin server and then be handed off to the correct disk. The correct disk is a function of the required data and the processing availability on that disk. Alternatively, it can be put on the fastpath to an available disk which will redirect the connection if need be. This second alternative further reduces the load on the thinserver and, potentially, reduces the number of handoffs. In either case, the thinserver takes on the role of CPU resource policing.

Figure 11:
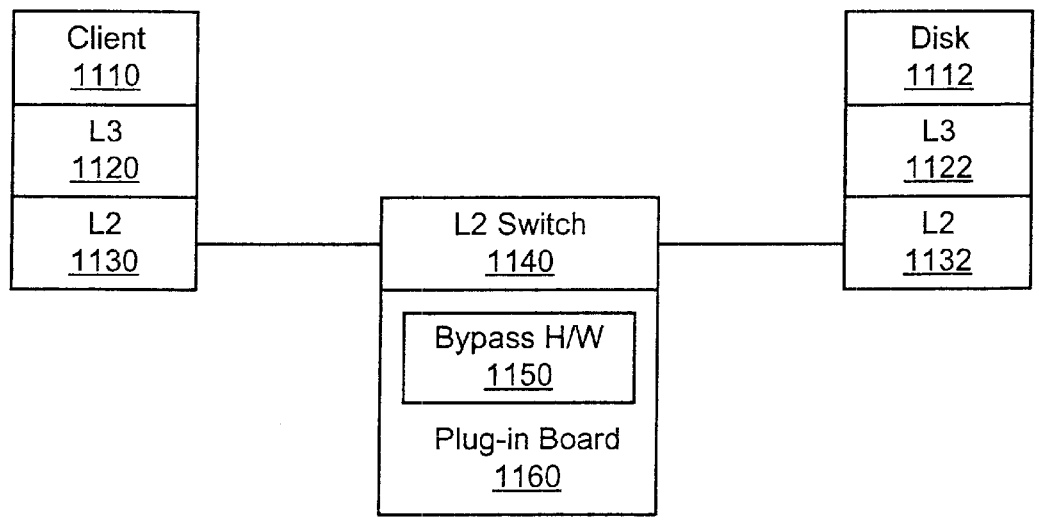
FIG. 11 is a block diagram of the communications between client and disk applications through various software layers and a switch.

NAT is generally thought as a layer-3 function; however, depending on the implementation, layer 2 address translation may be required. Ideally, any address swapping functionality will be performed in hardware. The goal is to remove the server from the datapath. FIG. 11 shows the general layering of the NAS system. There is a client 1110 that interfaces to the thinserver that is on a plug-in board 1160 in a switch 1140–1160. The client requests pass through level three (L3) 1120 and level two (L2) 1130 software layers. The switch is also connected to a disk 1112 through level two 1132 and level three 1122 software layers, allowing the client to directly access the disk or the thinserver. Switching takes place at the level two 1140 layer. The client believes that it is accessing the thinserver and sends packets to the thinserver's (virtual) IP address. Because the client does not know about the disk, in the switch unit filters and switches packets to the correct destination, a disk or the thinserver. This filtering and switching can be implemented in the switch fabric, in bypass hardware 1150 on a plug-in board, or in software on a plug-in board 1160.

The forwarding process preferably is based on L2 addresses to enhance performance. However, determining the next hop must be based on at least a client (source) IP address, IP protocol type, and transport protocol source port. Thus, either the L2 destination address may be changed by the forwarding process or the disk interface may be set to receive the plug-in board's L2 address. The disk uses the virtual IP address as the source address and the client's IP address as the destination address. It uses its L2 address as the source L2 address and the appropriate next hop as the destination L2 address.

The system management features reduce the total cost of ownership of the present invention. The less training that is required to configure the system, the better. There are two main plug-and-play features that can be incorporated in the present invention. An auto-configuration mechanism serves the workgroup/small-to-middle-sized-enterprise (SME) environment. This involves using DHCP to assign IP addresses, optionally from a private address space, to the disks. The slave control protocol is used to provide timing, file system, and other information to the disks. Disks are then logically automounted into the networked file system (it is a logical procedure as the master server does not really have a file system running). The automount procedure is to number the disks using an increasing sequence number, e.g., disk0, disk1, disk2, and so forth. Using disk serial numbers alternatively allows for reduced client-side changes when a boot sequence changes. The logical automount procedure can be specified at boot time since the automount information can be contained in a configuration file (automounters are COTS technology). This allows the potential use of storage management software to easily configure the disks which may be of interest to MLE IT/IS departments. Thus, the disk names do not have to be generic disk0, disk1, and so forth and can appear in different configurations (i.e., not the mounting all the disks off the same directory).

For users that desire single large disks, the server provides this functionality by operating its own slave server 1040. Storage aggregation is a function that must be provided by a central point-of-control. The present invention includes two types of storage aggregation, basic RAID support 1070 and virtual disks 1072–1074. Basic RAID support provides mirroring and striping support for a large set of disks (which do not need to run server software, simply a hardware-level interface such as SCSI over IP) using COTS technology which may be included in over operating systems such as Linux. Virtual disks, being dynamically extensible, can be implemented using hot-swap RAID technology as well. Thus, customers can store a large number of files within a directory (virtual directories 1042) and grow a single file to very large capacity (virtual files 1074). If more storage is required, more disks are added on-the-fly. Each disk may have cache memory. The total amount of cache memory may be larger with detached storage than SID storage because it is not shown among disks.

Because slave servers perform some operations on behalf of a client, disk load problems may be solved through the use of load balancing techniques in conjunction with the present invention. The slave servers also may mediate priorities among clients. The master slave servers are particularly useful in carrying out his function because most common file systems do not support assign the priorities.

Figure 12:
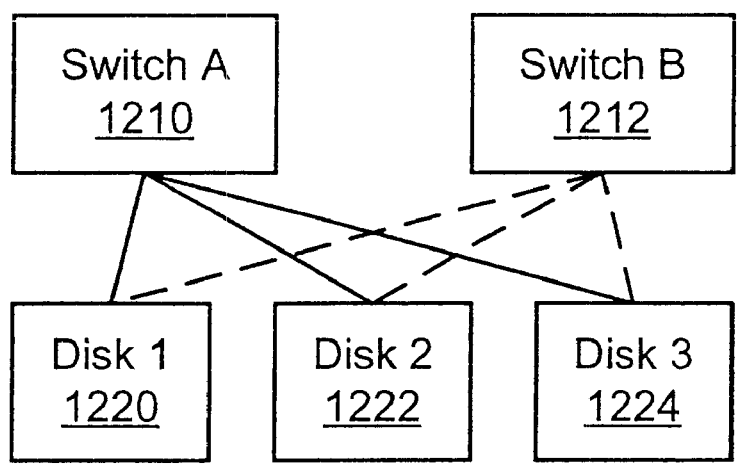
FIG. 12 is a block diagram of communications links and fail over patterns.
Figure 13:
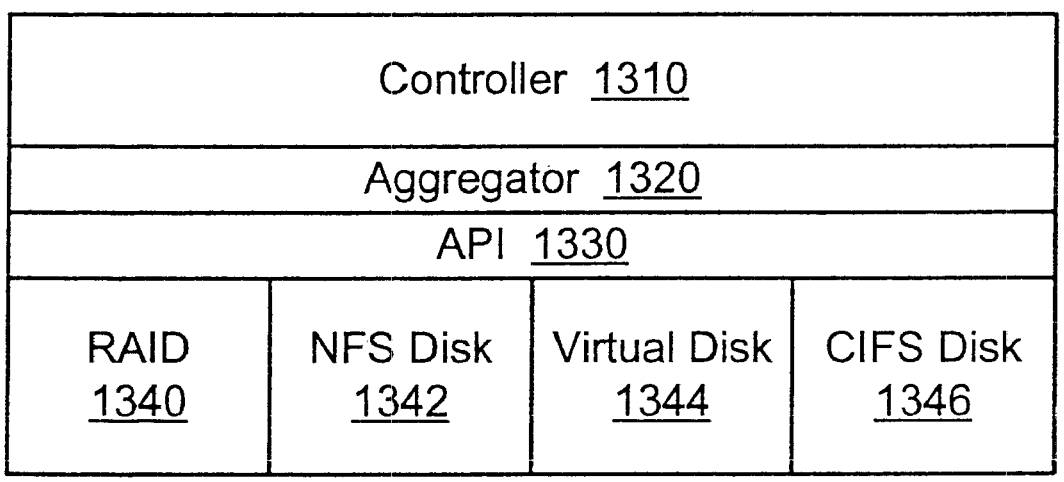
FIG. 13 is a block diagram of a second embodiment of the present invention.

The present invention further supports switch fail-over. FIG. 12 shows a dual NAS switch configuration. Switch 1210 is the operational switch and switch 1212 is a hot-standby. Alternatively, switch 1212 may be serving a load balancing function and assigned additional duty for standby. The switches may respond to either predicted or actual failure. There are three modes of failure, where the switch fails, where a link to a disk fails or where a disk itself fails. If switch 1210 fails, then the preferred operation is to have all connections transparently move to switch 1212. Handling this situation is fairly straightforward, being implemented as a combination of well-understood protocols such as Virtual Router Redundancy Protocol (VRRP) and the SCP/NIS protocols used in the back-end of the NAS system. In this situation, switch 1212 simply assumes switch 1210's L2 address. Each disk tracks the state of the connections for its own client and the thinserver on the switch to ensure coherency. Thus, the thinservers on switch 1210 and 1212 need to exchange policy, timing, and file system information.

A more complex failure mode is encountered when the link from switch 1210 to disk 1220 fails. A connection exists to disk 1220 via switch 1212. Alternative implementation includes moving all the sessions to switch 1212 (declaring switch a 1210 down) and only moving sessions involving disk 1220 to switch 1212. The former is as previously described. The latter is significantly harder as it requires more synchronization between switches 1210 and 1212; both switches must now coordinate the entire system. An alternative implementation is to simply have switch 1210 reroute traffic through switch 1212, but not have switch 1212 do any NAS processing.

A third mode of failure is disk failure. If a disk fails, then the switch may assist with disk recovery. For example, if RAID is used and a parity disk exists, it is possible to reconstruct the lost data from the parity disk. The switch will assist in this activity.

Switches 1210 and 1212 may engage in load balancing. Both of the switches are connected to the storage devices 1220, 1222, 1224, each storage device having multiple NICs in the preferred configuration. The first switch 1210 will have an IP address that is known to the client and the second switch 1212 may or may not have an IP address. The first switch, running a conventional load balancing algorithm, will determine that it should load-balance or hand off a particular file session. The file session identification, such as its layer 4 identification information (IP src address, IP dst address, src port, dst port, and IP protocol type) are forwarded to the second switch 1212. The second switch carries out whatever processing that is required and ultimately makes a request to a storage device. The data from the storage device then goes directly from the second switch to the client (not shown), removing some amount of data load from the first switch. The first switch also does not have to do any required processing on client requests and/or storage device responses.

To run the load balancing algorithm, the first switch 1210 can acquire information in several ways, such as monitoring the disks 1220, 1222, 1224, monitoring the traffic through the first switch 1210, monitor the number of client sessions it is handling, and monitor the processing load on the first switch. Using this information, the switch will determine if a file session should be forwarded. New sessions, if using TCP, can be identified by the layer 4 information and by examining the TCP SYN flag. If the session is to forwarded, an appropriate forwarding table should be made. To improve the performance, information can be obtained by the first switch from the second switch and from the disks regarding their load, including packet throughput and processing.

If the first and second switches include file systems, synchronization is required to keep the file system state correct. Standard distributed file system mechanisms can be used.

Switch managed load balancing can be combined with round robin DNS to perform multiple layers of load balancing. Round robin DNS can accomplish a coarse assignment of clients to various servers (switches, e.g. each switch has an IP address) and switch-based load balancing can transparently adjust the assignment.

Three ways to implement NAT functionality include using the thinserver CPU, using hardware on the plug-in card, and using the switch fabric. The ideal situation is if the client requests go from the client directly to the slave server without any CPU utilization by the master server or added delay that results in using a plug-in card hardware. This approach may be implemented by programmable filters in the switch fabric which are able to identify packets of interest and to replace MAC IP addresses. The filters are long enough to look deep into the packets as some of the target fields may be application protocol fields. The filters in the switch fabric are also useful in implementing device level security.

TCP fragmentation support may be integrated onto the plug-in card as TCP is likely to be frequently used. Full TCP support in the NIC chipset may be preferred. This offloads some server CPU processing. Additionally, TCP Handoff support in hardware may be used to enhance performance.

Because users who chose an NAS solution are likely to be using the switch primarily for that purpose, it may be preferred to give priority to NAS traffic over other types of traffic. NAS traffic can be identified by protocol field filtering.

The Linux operating system and open source software, including the Samba implementation of CIFS may be used. A configuration tool for the Samba implementation is preferred. NFS and RAID support may be included in the Linux kernel. A separate user-level NFS daemon may be used. An alternative approach is to use an embedded POSIX OS such as Lynx or QNX, the entire kernel of which can fit into cache on most embedded systems, and combine it with ported open source IP and file system stacks.

Further Details

Handoffs offer benefits when working with clustered systems, server area networks, network attached storage and other similar loosely distributed models. These systems can appear as a virtual IP host in which transport connections are directly forwarded to a particular node, such as a node furnishing responsive data, without affecting other nodes. Resource utilization is more efficient due to the direct forwarding. Fail-over or transfer of endpoints is transparent to the client. Handoffs may help solve problems with address leases, as in IPv6 renumbering. For servers utilizing network address translation (NAT), handoffs may assist the server if the NAT is performing a cluster-like role. With NAT, handoffs also may improve security.

Techniques of the present invention may minimize latency associated with handoffs. Support for standard management functionality should aid in early adoption of the present invention. Additional advantages will be apparent to those skilled in the art.

There are numerous advantages to the Master/Slave or Aggregator/Controller server strategy. This strategy builds on metaphors that are familiar to users and readily understood. Since the present invention uses COTS technology, IT/IS management strategies do not need to undergo significant changes or, quite likely, any changes whatsoever. The basic file system technologies that users are familiar with can be supported, including NFS, CIFS, and NetWare. Various access and security models are supported. Master NIS and primary domain controllers (PDCs) can be run on the switch with slave servers running on the disks. IT/IS training costs are lower, which provides a significant reduction in the storage system TCO.

The Master/Slave relationship allows a significant performance increase compared to similar SID systems with comparable component cost. It is expected to perform better than comparable SAD systems.

The auto-configuration capabilities should be very appealing to small enterprises and MLE workgroups that do not have significant IT resources. These capabilities allow quick and painless addition of new storage capacity and is cheaper than buying a whole new integrated system. It can easily grow with the user's needs. Thus, the long-term and short-term TCO for SME and workgroups are significantly lower. The autoconfiguration capabilities may also be of interest to MLE IT/IS departments from the standpoint of being able to easily add new disks for user home directory storage.

The Master/Slave relationship makes it significantly easier to provide transparent storage aggregation features. A new storage system is simply a master server to the old storage system, which becomes a slave server, or vice-versa, it is also easy to understand, manage, and grow.

Basic RAID functionality can be supported and is a value-added feature of the switch. Optimization features be extended to allow automatic replication of files to other storage devices, or an automated and transparent backup function.

The foregoing description of various embodiments of the invention has been presented for purposes of illustration and description. The description is not intended to limit the invention to the precise forms disclosed. Many modifications and equivalent arrangements will be apparent to people skilled in the art.

What is claimed is:

1. A method for handing off TCP sessions in a system including a client in communication with a switch and two or more devices also in communication with the switch, the method comprising the steps of:

determining in a first device which is participating with a client in a TCP session that a different device should take over the TCP session;

identifying a second device which should take over the TCP session;

sending one or more hand-off messages from the first device to the second device;

receiving in the first device an acknowledgment from the second device;

reporting to the switch that the second device is participating with the client in the TCP session; and acknowledging by the switch that the second device is participating with the client in the TCP session.

2. The method of claim 1, wherein the first and second devices are disk drives including file systems.

3. The method of claim 1, wherein the first and second devices are web servers.

4. The method of claim 1, wherein the first and second device are database servers.

5. The method of claim 1, wherein the first and second device are networked computing clusters.

6. The method of claim 1, wherein the first and second device are load balancing servers.

7. The method of claim 1, wherein the determining step includes evaluating the location of the data being processed in the TCP session.

8. The method of claim 1, wherein the determining step includes evaluating whether the data being returned to the client from a location other than the first device has reached a predetermined threshold.

9. The method of claim 1, wherein the determining step includes evaluating whether the data being returned to the client from another device has reached a predetermined threshold.

10. The method of claim 1, wherein the determining step includes evaluating the relative amount of data being returned to the client from the first device and one or more other devices coupled with the switch.

11. The method of claim 1, wherein the determining step includes evaluating the workload of the first device and one or more other devices coupled with the switch.

12. The method of claim 1, wherein the determining step includes evaluating the location of data being processed in more than one TCP session involving the first device.

13. The method of claim 1, wherein the first device is a disk drive equipped with a file system including a virtual root directory for the first device and other disk drive devices and the identifying step includes responding to a file request from the client by using the virtual root directory to identify the second device.

14. The method of claim 1, wherein the first device is a database server equipped with a table of database objects associated with the first device and other database server devices and the identifying step includes responding to a data object request from the client by using the table of database objects to identify the second device.

15. The method of claim 1, wherein the first device is a database server equipped with a table of transaction types associated with the first device and other database server devices and the identifying step includes responding to a transaction request from the client by using the table of transaction types to identify the second device.

16. The method of claim 1, wherein the first device is a database server equipped with a table of database subsystems associated with the first device and other database server devices and the identifying step includes responding to a request from the client by using the table of database subsystems to identify the second device.

17. The method of claim 1, wherein the first device is a load sharing server equipped with resources to monitor and analyze traffic through the switch and the identifying step includes responding to a request from the client by using the resources to monitor and analyze traffic to identify the second device.

18. The method of claim 1, wherein the first device is a load sharing server equipped with resources to receive availability messages from other load sharing devices and the identifying step includes responding to a request from the client by using the resources to receive availability messages to identify the second device.

19. The method of claim 1, wherein the first device is a load sharing server equipped with resources to interpret the requests from the client and the identifying step includes responding to a request from the client by using the resources to interpret the request from the client to identify the second device.

20. The method of claim 1, wherein a third device is equipped with a file system including a virtual root directory for the first device and other disk drive devices and the identifying step includes an inquiry from the first device and a response by the third device identifying the second device.

21. The method of claim 1, wherein a third device is equipped with a table of database objects associated with the first device and other database server devices and the identifying step includes an inquiry from the first device and a response by the third device identifying the second device.

22. The method of claim 1, wherein a third device is equipped with a table of transaction types associated with the first device and other database server devices and the identifying step includes an inquiry from the first device and a response by the third device identifying the second device.

23. The method of claim 1, wherein a third device is equipped with a table of database subsystems associated with the first device and other database server devices and the identifying step includes an inquiry from the first device and a response by the third device identifying the second device.

24. The method of claim 1, wherein a third device is equipped with resources to monitor and analyze traffic through the switch and the identifying step includes an inquiry from the first device and a response by the third device identifying the second device.

25. The method of claim 1, wherein a third device is equipped with resources to receive availability messages from load sharing devices and the identifying step includes an inquiry from the first device and a response by the third device identifying the second device.

26. The method of claim 1, wherein a third device is equipped with resources to interpret the requests from the client and the identifying step includes an inquiry from the first device and a response by the third device identifying the second device.

27. A method for handing off TCP sessions in a system including a client in communication with a switch and two or more devices also in communication with the switch, the method comprising the steps of:

sending one or more hand-off messages from the first device to the second device, wherein one of the handoff messages includes a kind field, a client port identification and a client IP address field;

receiving in the first device an acknowledgment from the second device;

reporting to the switch that the second device is participating with the client in the TCP session;

acknowledging by the switch that the second device is participating with the client in the TCP session.

28. A method according to claim 27 wherein the kind field, client port identification and client IP address fields appear in a TCP option.

29. A method according to claim 27 wherein the kind field, client port identification and client IP address fields appear in a IP option.

30. A method according to claim 27 wherein the kind field, client port identification and client IP address fields appear in a data field.

31. A method according to claim 27 wherein one of the handoff messages further includes a sequence number field and an acknowledgment number field.

32. A method for handing off TCP sessions in a system including a client in communication with a switch and two or more devices also in communication with the switch each having a TCP state machine, the method comprising the steps of:

sending one or more hand-off messages from a first device to a second device;

receiving in the first device an acknowledgment from the second device;

reporting to the switch that the second device is participating with the client in the TCP session;

acknowledging by the switch that the second device is participating with the client in the TCP session.

33. A method according to claim 32 wherein one or more handoff messages include TCP state information.

34. A method according to claim 32 wherein the first and second devices run an application program and one or more handoff messages include application program state information.

35. A method according to claim 32, wherein one of the handoff messages includes a Set flag, sending the Set flag causes the first device to transition from an Established state into a Set sent state and receipt of the Set flag causes the second device to transition from an Established state into a Set received state.

36. A method acccording to claim 32 wherein the handoff request messages indicate that the second device will send messages to the client and the first device will continue to receive messages from the client.

37. A method according to claim 32 wherein the handoff request messages specify that the second device will receive messages from the client and the first device will continue to send messages to the client.

38. A method according to claim 32 wherein the handoff request messages specify that the second device will send messages to the client and the first device will continue to receive messages from the client.

39. A method for handing off TCP sessions in a system including a client in communication with a switch and two or more devices also in communication with the switch each having a TCP state machine, the method comprising the steps of:
- sending one or more hand-off preparation messages from a first device to one or more other devices;
- receiving in the first device acknowledgments from the other devices;
- determining in the first device to proceed with a handoff;
- identifying a second device to receive the handoff from among the other devices which have acknowledged a handoff preparation message;
- sending one or more hand-off messages from the first device to the second device;
- receiving in the first device an acknowledgment from the second device;
- reporting to the switch that the second device is participating with the client in the TCP session;
- acknowledging by the switch that the second device is participating with the client in the TCP session.

40. A method according to claim 39 wherein one or more handoff messages include TCP state information.

41. A method according to claim 39 wherein the first and second devices run an application program and one or more handoff messages include application program state information.

42. A device capable of handing off TCP sessions including a client in communication with a switch and plurality of more devices also in communication with the switch, the device comprising:
- a switch including logic for routing messages among a client and a plurality of devices and logic responsive to an instruction to reprogram its routing of messages and to confirm that reprogramming is complete;
- a first device including logic to determine when a TCP session should be handed off to another device, logic to instruct a second device to accept a handoff and logic to instruct the switch to reprogram its routing of messages;
- wherein the a second device is in communication with the switch, and includes logic responsive to an instruction to accept a handoff and to confirm acceptance of the handoff.

43. The device of claim 42, wherein the first and second devices are disk drives.

44. The device of claim 42, wherein the first and second devices are web servers.

45. The device of claim 42, wherein the first and second devices are database servers.

46. The method of claim 42, wherein the first and second device are networked computing clusters.

47. The method of claim 42, wherein the first and second device are load balancing servers.

48. The device of claim 42, wherein the logic to determine when to handoff a TCP session is based on evaluating the location of the data being processed in the TCP session.

49. The device of claim 42, wherein the logic to determine when to handoff a TCP session is based on evaluating whether the data being returned to the client from a location other than the first device has reached a predetermined threshold.

50. The device of claim 42, wherein the logic to determine when to handoff a TCP session is based on whether the data being returned to the client from an other device has reached a predetermined threshold.

51. The device of claim 42, wherein the logic to determine when to handoff a TCP session is based on evaluating the relative amount of data being returned to the client from the first device and one or more other devices in communication with the switch.

52. The device of claim 42, wherein the logic to determine when to handoff a TCP session is based on evaluating the workload of the first device and one or more other devices in communication with the switch.

53. The device of claim 42, wherein the logic to determine when to handoff a TCP session is based on evaluating the location of data being processed in more than one TCP session involving the first device.

\* \* \* \* \*